United States Patent [19]

Neinart et al.

[11] 3,908,644

[45] Sept. 30, 1975

[54] LIGHTWEIGHT ORTHOPEDIC CAST MATERIAL

[75] Inventors: Louis F. Neinart, Elizabeth; Robert C. Linares, Warren; Paul Jeges, Woodbridge; Zvi Blank, Morris Plains, all of N.J.

[73] Assignee: Allied Chemical Corporation, New York, N.Y.

[22] Filed: June 24, 1974

[21] Appl. No.: 482,118

[52] U.S. Cl.................................. 128/90; 128/156
[51] Int. Cl.².............................. A61F 5/04
[58] Field of Search....................... 128/90, 89, 156

[56] References Cited
UNITED STATES PATENTS

| | | | |
|---|---|---|---|
| 3,301,252 | 1/1967 | Mahoney, Jr. | 128/90 |
| 3,373,741 | 3/1968 | Hill et al. | 128/90 |
| 3,572,330 | 3/1971 | Gander | 128/90 |
| 3,604,413 | 9/1971 | Burg et al. | 128/90 |
| 3,656,476 | 4/1972 | Swinney | 128/90 |
| 3,683,903 | 8/1972 | Fox et al. | 128/90 |

*Primary Examiner*—Richard A. Gaudet
*Assistant Examiner*—J. Yasko
*Attorney, Agent, or Firm*—Roger H. Criss; Arthur J. Plantamura

[57] ABSTRACT

A system for forming a rigid orthopedic structure comprising bandage material impregnated with at least about 10% by weight of a member of the group consisting of a monomer of the formula:

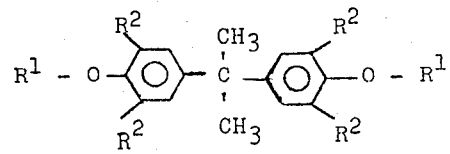

wherein $R^1$ is an acrylic substituent and each $R^2$ independently is H, $CH_2OH$ or $CH_2CH_2OH$, a prepolymer of said monomer and mixtures thereof; and a dual component curing system for said impregnated bandage including: a first curing component comprising an organic peroxide and a volatile solvent therefor and a second curing component comprising a tertiary amine polymerization promoter.

The invention also discloses a process for curing in situ a bandage preimpregnated with a monomer or prepolymer or mixture thereof which is characterized by having active sites capable of further reaction, and which is curable with a dual curing system including an organic peroxide and a polymerization promoter by applying the two curing components to the bandage simultaneously.

16 Claims, No Drawings

LIGHTWEIGHT ORTHOPEDIC CAST MATERIAL

FIELD OF THE INVENTION

This invention is directed to improved, light-weight water-resistant, rigid orthopedic structures, particularly orthopedic casts.

BRIEF DESCRIPTION OF THE PRIOR ART

The plaster cast, a composite of a cotton bandage and interlocking gypsum microcrystals, has been used with little change since its inception in 1852. The setting process employed to cure the plaster case is critical in that disturbance of the partially crystallized gypsum will result in breaking of the microcrystals, with subsequent weakening of the cured cast. Since such factors as water content, water temperature and curing conditions are critical, the fact that plaster has been used successfully at all can be attributed mainly to the rigid adherence to specified steps in its application. The application steps are important not only from the point of view of strength of the cast, but also from the point of view of patient comfort and health. Wet plaster bandage is very soft so it can be applied in layers having good interlaminar contact without undue pressure on bone or muscle; however, any stretching during application will cause pressure on the body by the set cast with consequent loss of circulation or extreme irritation. Additional difficulties in the applied plaster casts are caused by its properties when wet. Specifically, when applying the plaster cast, the bandage must be wetted and since the drying period is many hours in length, the body skin will remain moist and irritated for an extended period. After the cast has dried, body perspiration keeps the cast moist, producing an offensive odor and irritation while contributing to the deterioration of the cast.

Moreover, once the plaster cast has been applied, plaster casts possess other serious drawbacks in that the high X-ray absorption of plaster reduces contrast in X-ray photographs; they have poor shelf life; are messy to apply; are difficult to keep clean; and are heavy and cumbersome due to their low strength to weight ratio.

Various approaches have been used to produce plastic casts which could replace the plaster of Paris casts but these efforts have heretofore met with little success.

One system of this kind is based upon the impregnation of a substrate cloth or bandage with a solution of a polymer in a suitable solvent possessing a relatively fast evaporation rate, followed by application of the impregnated bandage onto the body member. A specific cast system produced using this system comprises a reinforced polyester with a low softening point such as a fiberglass/cellulose-acetate loose knit fabric which when soaked in an acetone-based solvent and rolled onto a body-member fuses to produce the cured cast. The main disadvantage to this system is that dry films of most polymers are, in general, practically impermeable to solvent vapors, so that a reasonably fast formation of a strong cast is very unlikely since its application would require the formation of one layer at a time. Thus the fusion or hardening rate depends on the evaporation of the solvent, e.g., acetone; moreover, the fumes emanating from the required large volume of acetone generally present an intolerable situation both as to the effect on the doctor and patient as well as from the attendant fire hazard. It is possible to increase the evaporation rate of the solvent by using a heat source such as a hot air gun, however, this requires the application of heat to the body at a time when heat should ordinarily be removed in order to reduce swelling. Additionally, a cast fashioned in this manner would have a tendency to delaminate since dry polymer films will not stick together unless they are properly wet.

Another approach to a plastic cast is based on the spontaneous polymerization of a monomer or monomers preimpregnated onto the bandage and further cured by means of chemical catalysts, heat or ultraviolet radiation. A specific cast system using this approach is described in U.S. Pat. No. 3,421,501 and comprises a fiberglass knit fabric bandage impregnated with an unsaturated polyester resin capable of crosslinking. The cast is cured by exposing the preimpregnated, rolled-on bandage to ultraviolet radiation for at least three minutes to effect crosslinking. In accordance with this method, the requirements of ultraviolet curing conditions presents undesirable exposure to the administering medical personnel; also special equipment is needed, and it is necessary to hold the limb in position during irradiation. Moreover, it is difficult or impossible to irradiate certain portions of the body.

Cast systems have also been developed based on preimpregnating the bandage with a polymer, preferably a polymer containing active sites, and just prior to its application onto the body member further soaking in a solution based on a reactive diluent. Further polymerization resulting in complete curing is promoted via use of chemical catalysts, heat or ultraviolet radiation. One such system is described in U.S. Pat. No. 3,089,496 and comprises a bandage preimpregnated with a plasticized methacrylate polymer containing a polymerization activator and a sufficient amount of excess peroxide catalyst to polymerize the monmer in which this bandage is immersed just prior to application. This method results in a system having minimal shelf life due to the relatively low degree of stability of the bandage preimpregnated with the peroxide. Since the preimpregnated bandage is immersed in a monomer prior to application, the bandage must be promptly applied to the body member since gelling quickly occurs. Moreover, the resulting methyl-methacrylate-based cast possesses relatively low dimensional stability together with a high degree of shrinkage.

There is thus a need for a non-allergenic system which upon curing will produce a strong, water-resistant, light-weight, air and x-ray permeable, non-shrinking, non-constraining cast which can be applied with a minimum of difficulty without any special equipment. Moreover, there is a need for a cast system which will have an extended shelf life while being capable of being cured within a very rapid period of time, a combination of properties heretofore unattainable in plastic cast systems.

SUMMARY OF THE INVENTION

In accordance with the present invention, a novel improved system is presented wherein a bandage is preimpregnated with a monomer or prepolymer or mixture thereof which is characterized by an epoxide group adjacent an acrylic group, said groups providing active sites capable of further reaction. This preimpregnated bandage may then be packaged and stored until needed for application. The novel system of the invention includes two separately packaged component solutions which are used to cure the cast at the time of application.

The invention is also directed to a novel method for the curing of an orthopedic structure comprising a bandage which is preimpregnated with a monomer or prepolymer or mixture thereof which is characterized by having active sites capable of further reaction, the impregnant being curable with the known dual curing systems including organic peroxide and a polymerization promoter.

The invention is directed to a rigid orthopedic structure comprising a bandage impregnated with at least about 10% by weight of a member of the group consisting of a monomer of the formula:

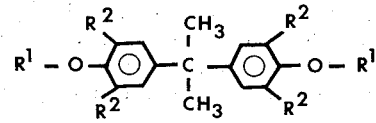

wherein $R^1$ is an acrylic substituent and each $R^2$ independently is H, $CH_2OH$ or $CH_2CH_2OH$, a prepolymer of said monomer, and mixtures thereof; and a dual component curing system for said impregnated bandage including: (i) a first curing component comprising an organic peroxide and a volatile solvent therefor and (ii) a second curing component comprising a tertiary amine polymerization promoter. The prepolymer of the monomer has a viscosity in the range of about 2,000 to 8,000 centistokes.

In accordance with the method of the present invention, the bandage is impregnated such as by dipping, roller coating, spraying, etc., with the impregnant formed into a liquid suspension or solution so that the liquid composition is applied directly onto the bandage substrate. The impregnated bandage is then sealed and stored until required for application.

The curing system, the components of which are chosen to effect curing expeditiously at the time of application of the cast, are preferably selected with regard to the following considerations: they must be virtually non-toxic and non-irritant to the skin, mucous areas of the body, the eyes, etc. The components must allow flexibility in terms of choosing the appropriate curing period; the cast must be easy to prepare and apply; handling and shipping of the materials must not present severe fire hazards; and the materials must be relatively stable in storage while requiring minimum care in handling.

An appropriate curing system taking into account the aforementioned factors, may be prepared by utilizing two separately packaged component solutions and subsequently applying these solutions to the impregnated bandage substantially at the time when the cast is to be formed. A first component of the curing system comprises an organic peroxide catalyst. This catalyst may be either packaged separately and mixed with a suitable solvent at the point of application or the catalyst component may be dissolved in a suitable solvent and stored as a solution.

The second component of the curing system comprises a polymerization promoter or accelerator which facilitates the curing reaction, preferably at room temperature and in the presence of oxygen. Suitable promoters include the tertiary amines such as dimethyl-p-toluidine, m-phenylene-diamine, methylene diamine, diethylene triamine, etc. The choice of the promoter-accelerator will depend on the catalyst, the final composition of the product and the curing requirements. If desired, the promoter may be dispersed in a relatively non-volatile solvent to ensure even distribution of the promoter on the bandage when the promoter is applied to the bandage.

The actual application of the curing solutions to the impregnated bandage may involve a number of different procedures including dipping, spraying, etc. or a combination of such methods.

The invention is also directed to a method for constructing and curing an orthopedic structure comprising applying a bandage preimpregnated with a monomer or prepolymer or mixture thereof which is characterized by having active sites capable of further reaction, the impregnant being curable with the known dual curing systems including an organic peroxide and a polymerization promoter and curing in situ by applying the two curing component systems to the bandage simultaneously.

Thus, in accordance with the method of the present invention, we have provided a water-resistant, lightweight, mechanically strong cast permeable to X-rays. Moreover, the components of the unique cast of the invention are easy to store, possess an extended shelf life, the cast is easy to apply and the conditions effected during curing are such that they produce rapid curing while acting to beneficially remove heat from the composition during polymerization.

Additionally, we have provided a novel method for the curing in situ of orthopedic structures comprising bandages impregnated with any plastic material capable of being cured with known organic peroxide-accelerator polymerization systems.

DESCRIPTION OF THE PREFERRED EMBODIMENTS

In accordance with one embodiment of the present invention, the bandage may be impregnated with at least about 10% by weight of a member of the group consisting of a monomer of the formula:

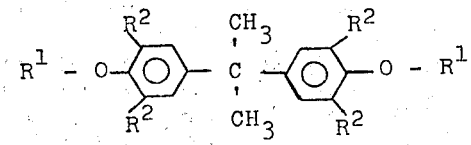

wherein $R^1$ is an acrylic substituent and each $R^2$ independently is H, $CH_2OH$ or $CH_2CH_2OH$, a prepolymer of the monomer or a mixture of the monomer and prepolymer. For the purposes of this disclosure, the term "acrylic substituent" is meant to include any substituent having an acrylic group of the formula:

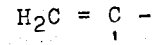

particularly the acrylate, methacrylate, butyl acrylates and the corresponding glycidyl compounds.

Exemplary of members of such group are monomers and prepolymers of bisphenol A-glycidyl dimethacrylate; 2,2',6,6'-tetrahydroxymethyl bisphenol A-dihydroxyethylacrylate; 2,2',6,6'-tetrahydroxyethyl bisphenol A-dihydroxyethylacrylate; 2,2',6,6'-tetrahydroxyethyl bisphenol A-dimethacrylate; and 2,2',6,6'-tetrahydroxymethyl bisphenol A-dimethacrylate. Preferably, a monomer, prepolymer or mixture thereof of bisphenol A-glycidyl dimethyacrylate is employed, the prepolymer having a viscosity of about 2,000–8,000 centistokes. Preferably, all $R^2$ are identical.

As an example, the preferred monomer, bisphenol A-glycidyl dimethacrylate, is the reaction product prepared by combining 2 to 3 moles glycidyl methacrylate per mole bisphenol A (4,4'-isopropylidenediphenol). To this reaction mixture is added 0.5 to 2.0% by weight of a catalytic tertiary amine such as dimethyl-p-toluidine and from 50 to 200 ppm of a polymerization inhibitor such as hydroquinone. The preparation of this and other similar reaction products is disclosed in U.S. Pat. No. 2,824,851. Before the reaction has gone to completion, and preferably when the mixture is formed, at least one diluent chosen from the group consisting of ethylene glycol dimethyacrylate, diethylene glycol dimethacrylate, triethylene glycol dimethacrylate and tetraethylene glycol dimethacrylate may be added to lower the viscosity of the mixture. Alternatively, if amounts of the glycidyl methacrylate in excess of the stoichiometric amount are employed, this excess will function as a reactive diluent in lowering the viscosity of the solution.

Optionally, it may be desired to add fillers to the reaction mixture. While polymeric fillers, such as comminuted methyl methacrylate may be employed, flexural tests of the resulting filled composites indicate a reduction in strength. It has, however, been found that the use of such fillers as silica, glass microspheres, etc. in amounts up to about 20% by weight, preferably up to about 10% by weight, result in a superior composite product. Specifically, tests of a composite prepared containing 10% by weight silica (Cab-o-Sil, Grade M5) indicated a 50 – 60% improvement in strength and a 35% improvement in stiffness over the unfilled composite. If such fillers are used, it is desirable to treat them with a silane coupling agent prior to incorporation into the impregnant solution.

Other components or modifying agents such as therapeutic compounds, disinfectants, deodorants, coloring agents, fire-retardants, etc. may also be added to this diluted mixture. We have also found that the use of a light-sensitive catalyst, e.g., benzil, in the bandage will increase the rate of curing if the bandage is kept from light until the time of application.

The substrate material which is to be impregnated should preferably be a water-resistant, rather loose material having an open mesh structure. Suitable materials include polypropylene, however, fiberglass is preferred. Any relatively fine fiberglass bandage material may be utilized. Illustrative of material of this kind which may be employed is the fiberglass material disclosed in U.S. Pat. No. 3,787,272. It is desirable that the fiberglass bandage be treated with a silane coupling agent prior to impregnation. The silane coupling agent functions as a bond between the organic polymers and the fiberglass surface as well as to lubricate and protect fibers during subsequent processing steps. Suitable silane coupling agents include for example 3,4(epoxycyclohexyl)ethytrimethoxysilane and γ-glycidoxypropyltrimethoxysilane.

The substrate or bandage material may be impregnated by dipping in the liquid reaction mixture and passing through a series of rollers to thoroughly impregnate the material. While this method of impregnation may be advantageously used, it is understood that any other suitable method such as spraying may readily be employed. In any event, it has been found that the impregnant coating applied to the substrate is applied so as to constitute at least 10%, preferably from about 35 to about 45% by weight of the bandage. The thus impregnated material is then cut into size suitable for bandages, wrapped in suitable packages, sealed and stored.

The organic peroxide used as catalyst in the first component of the curing system may be any of the well-known peroxide compositions which assist in the curing of certain polymers. Among the suitable peroxides are t-butylperoxy pivalate, 2,4-dichlorobenzoyl peroxide, caprylyl peroxide, lauroyl peroxide, acetyl peroxide, t-butyl peroxyisobutyrate, benzoyl peroxide, p-chlorobenzoyl peroxide, hydroxyheptyl peroxide, cyclohexanone peroxide, di-t-butyl deperphthalate, t-butyl peracetate, t-butyl-peroxy isopropyl carbonate, t-butyl perbenzoate, dicumyl peroxide, t-butyl hydroperoxide, methyl ethyl ketone peroxide, di-t-butyl peroxide, p-menthane hydroperoxide, pinane hydroperoxide, cumeme hydroperoxide, 2,5-dimethyl-2,5-dihydroperoxide, t-butyl hydroperoxide-90 and bis-4-t-butylcyclohexyl peroxy dicarbonate. The catalyst should in general be applied to the bandage in an amount of about 0.1 to 1% by weight of the impregnant, however, amounts greater than 1% may be employed with no deteterious effects.

It is desirable that the solvent used in this first component of the curing system be of a relatively volatile nature. The advantage of using a volatile solvent in this component of the curing solution resides in the benefit resulting from the evaporation of the solvent from the bandage during curing which aids in keeping the temperature of the bandage low during curing. Although many volatile solvents such as benzene, toluene, methyl ethyl ketone, dioxane, etc. or a mixture of such solvents may be used, the final choice of solvent depends upon the particular catalyst employed. In this regard, we have found that a particularly desirable solvent for use with the benzoyl peroxide catalyst comprises a mixture of about 50% by weight methylene chloride, 20% trichloroethylene, 10% chloroform and 20% acetone.

The solution containing the organic peroxide catalyst may be either prepared in advance and stored, preferably under refrigeration, or the organic peroxide and solvent may be packaged separately and combined just prior to application. The latter packaging method gives an indefinite shelf-life to the component solution.

The second component of the curing system comprises a tertiary amine polymerization promoter accelerator. Included among the preferred amine compositions are n-phenylenediamine, methylene diamine, diethylene triamine, dimethylaniline, or any disubstituted aromatic amines including those of the formula:

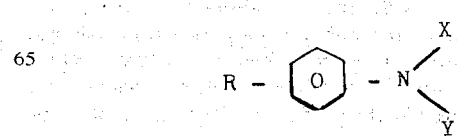

wherein R is H or $CH_3$ and X and Y are independently $CH_3$, $C_2H_5$ or $CH_2$—$CH_2OH$, e.g., dimethyl-p-toluidine. In order to effect curing the polymerization promoter should be present in an amount of 0.1 to 6% by weight of the impregnant however larger quantities may be employed. If desired, any inert solvent suitable for use with the particular tertiary amine may be employed. In particular, we have found that when dimethyl-p-toluidine is used as the promoter, cyclohexane is a preferred solvent since it is not highly volatile and will allow diffusion of the promoter into the impregnated bandage.

If either or both of the two curing system components are to be applied using an aerosol system, a suitable propellent is incorporated in the solvent solution.

Prior to application of the bandage, the injured member is preferably covered with a suitable protective layer to insulate the cast from the member during the curing procedure. This protective layer may be in the nature of a removable plastic or rubber sheet. Preferably it comprises a woven or non-woven relatively water-repellent material such as polypropylene or polyester which functions also as a cushion for the member and is conveniently retained as part of the cured cast.

The bandage may be applied and cured using many of the conventional procedures which are used with Plaster of Paris or currently available "plastic" casts. Additionally, a convenient method for curing may comprise the dispensing arrangement disclosed in copending application Ser. No. 402,529, filed on even date herewith of L. F. Nienart entitled "Orthopedic Bandage Core". When this dispensing device is employed, a sealable dispensing core container is filled with the promoter curing component solution, the bandage wrapped around the dispensing device and then the entire package is sealed and stored. At the time of application, the bandage is removed from its wrapping, the cap of the core container is loosened or unsealed so as to allow the curing solution to pass through the apertures in the housing and into the bandage. To facilitate distribution of the solution, the bandage is kneaded before application onto the injured body member. The final curing is then effected by spraying the applied bandage with the organic peroxide solution using either an aerosol can or a hand pump bottle. The latter procedure has the two-fold advantage of not requiring any aerosol propellants, as well as of producing the solution in particles larger than those produced using an aerosol system.

Moreover, in accordance with an additional aspect of the present invention, we have found that a novel method for constructing orthopedic casts and curing the cast in situ may be utilized in conjunction with bandages impregnated with any monomer or prepolymer or mixture of monomer and prepolymer capable of being cured using the known dual component systems including an organic peroxide and a polymerization promoter such as those disclosed for example in U.S. Pat. No. 3,215,137 as well as with the novel orthopedic system disclosed herein, and comprises applying the two curing components to the bandage simultaneously.

In accordance with one embodiment of this novel curing procedure, the bandage may be cured using a codispensing aerosol system wherein the two component curing solutions are sprayed simultaneously on the bandage or sprayed through any of a variety of commercially available co-dispensing systems which intermix two streams while dispensing through a single spray orifice. Using this procedure, the component solution containing the promoter is packaged with a high operating pressure propellant, such as dichlorodifluoromethane, while the organic peroxide solution is packaged in a separate bulb entirely surrounded by the promoter solution and propellant. When the spray system is activated, the pressure surrounding the bulb causes a stream of the peroxide solution to be mixed with the stream of promoter solution being dispensed and the combined streams are then dispensed through the single orifice.

An alternate method used to cure the applied bandage is similar to the co-dispensing aerosol system, however, this system employs two separate containers in which the two curing components are separately packaged and to which a single spray head which merges the two components and emits a single combined stream is attached. The container for the promoter solution and propellant is of a high pressure nature; the second container may be of plastic and contains the solvent for the peroxide while the peroxide itself is packaged as a dry solid. When curing is desired, the peroxide catalyst is added to the appropriate solvent and the single spray head attached to the two containers. When activated, the separate streams dispersed from each container are combined in the spray head and emitted as one stream. A spray tool head, e.g. one manufactured by Crown Industrial Products, Co., Hebron, Ill., is suitable for this embodiment.

The invention will be further explained by the following examples.

EXAMPLE 1

4,4'-Isopropylidenediphenol (87g) was added to 150g of glycidyl methacrylate and 0.02g of hydroquinone and the temperature brought up to 60°C with a cover of dry $N_2$ gas until the solution was clear of all solid particles. The tertiary amine, dimethyl-p-toluidine (2.0g in weight) was added and the reaction flask covered with aluminum foil to keep out light. When reaction was complete, 12g by weight of silica filler was added and dispersed throughout the reaction mixture.

Knit fiberglass fabric was passed through the reaction mixture and worked through rollers to fill voids in the yarn and rolled into a bandage of desired size. The total impregnant comprised about 40% by weight of the bandage. The thus impregnated bandage was wrapped in polyethylene lined aluminum foil and stored.

EXAMPLE 2

The procedure of Example 1 was repeated using 2 moles 2-hydroxyethyl acrylate per mole 2,2',6,6'-tetrahydroxymethyl-4,4'-isopropylidenediphenol. No filler was added; however, the reaction mixture was diluted with ethylene glycol dimethacrylate and then used to impregnate the fiberglass bandage.

EXAMPLE 3

The procedure of Example 1 was repeated using 2 moles methacrylate per mole 2,2',6,6'-tetrahydroxyethyl-4,4'-isopropylidenediphenol. The reaction mixture was then used to impregnate a polypropylene bandage.

EXAMPLE 4

The impregnated bandage of Example 1 was dipped into a cyclohexane solution containing 10% by weight dimethyl-p-toluidine and the wetted bandage kneaded for about 1 minute. The bandage was then wrapped onto a mandrel and cured by spraying with a solution containing 5% by weight of the solution of benzoyl peroxide in a solvent consisting of 50% methylene chloride, 20% trichloroethylene, 10% chloroform and 20% acetone.

EXAMPLE 5

The core container of a dispensing device previously described was filled with 3.5 ml of a 10% solution of dimethyl-p-toluidine. The impregnated bandage of Example 1 was wrapped around the sealed, filled device and the entire system wrapped and stored. When application was desired, the cap of the core was partially loosened and the bandage kneaded for about 1 min. to allow the curing solution to be uniformly dispersed throughout the bandage. The wetted bandage was then applied to a mandrel and cured using the procedure described in Example 4.

EXAMPLE 6

A co-dispensing aerosol can containing the two curing components was used to effect simultaneous spraying and in situ curing of the impregnated bandage of Example 1. The bandage began to harden within about 1 minute after spraying and cured completely in 3 to 10 minutes. Temperature rise was barely detectable and was noted as slightly warm to the touch. Shrinkage was low as evidenced by the fact that the cured bandage was slipped off a straight mandrel without any difficulty.

EXAMPLE 7

In situ curing of the applied impregnated bandage of Example 3 was accomplished by spraying the two curing components from separate containers using one spray tool head (Crown Industrial Products Co.). Rapid curing of the cast was achieved as in Example 6.

It is to be understood that variations and modifications of the present invention may be made without departing from the scope of the invention. It is also to be understood that the scope of the invention is not to be interpreted as limited to the specific embodiment disclosed herein but only in accordance with the appended claims when read in light of the foregoing disclosure.

We claim:

1. A system for forming a rigid orthopedic structure comprising: (a) a bandage material impregnated with at least about 10% by weight of a member of the group consisting of a monomer of the formula:

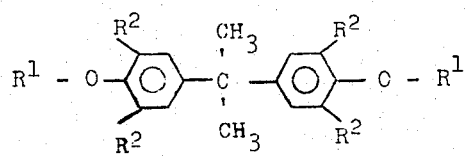

wherein $R^1$ is an acrylic substituent and each $R^2$ independently is H, $CH_2OH$ or $CH_2CH_2OH$, a prepolymer of said monomer, and mixtures thereof, and (b) a dual component curing system for said impregnated bandage comprising:
   i. a first curing component comprising an organic peroxide and a volatile solvent therefor; and
   ii. a second curing component comprising a tertiary amine polymerization promoter.

2. The system of claim 1 wherein the acrylic substituent is chosen from the group consisting of acrylate, methacrylate, and glycidyl methacrylate.

3. The system of claim 1 wherein the impregnant comprises bisphenol A-glycidyl dimethylacrylate.

4. The system of claim 1 wherein the impregnant is present in an amount of about 35 to 45% by weight of the bandage.

5. The system of claim 1 wherein the impregnant includes a diluent chosen from the group consisting of ethylene glycol dimethacrylate, diethylene glycol dimethacrylate, triethylene glycol dimethacrylate, and tetraethylene glycol dimethacrylate.

6. The system of claim 1 wherein the organic peroxide curing component is packaged separately from the solvent and the two are combined at the point of application.

7. The system of claim 1 wherein the tertiary amine curing component is dissolved in a relatively non-volatile solvent.

8. The system of claim 1 wherein the impregnant includes up to about 20% by weight of a filler material.

9. The system of claim 1 wherein the bandage material comprises fiberglass which has been treated with silane coupling agent prior to impregnation.

10. A process for obtaining a rigid orthopedic structure for a body member comprising:
   a. enclosing said body member in a bandage impregnated with at least about 10% by weight of a member of the group consisting of a monomer of the formula:

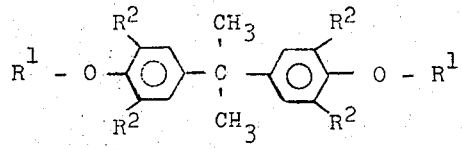

wherein $R^1$ is an acrylic substituent and each $R^2$ independently is H, $CH_2OH$ or $CH_2CH_2OH$, a prepolymer of said monomer and a mixture thereof;
   b. curing said impregnated bandage with a dual component curing system comprising:
      i. a first curing component comprising an organic peroxide and a volatile solvent therefor; and
      ii. a second curing component comprising a tertiary amine polymerization promoter.

11. The method of claim 10 including applying said first and second curing components to the bandage simultaneously.

12. The process of claim 10 wherein said bandage is cured by applying the tertiary amine polymerization promoter to the bandage prior to enclosing the member and subsequently spraying the applied bandage with a solution of said organic peroxide.

13. The process of claim 10 wherein the impregnant comprises bisphenol A-glycidyl dimethacrylate; said first curing component comprises benzoyl peroxide and a solvent comprising a mixture of approximately by weight 50% methylene chloride, 20% trichloroethylene, 10% chloroform and 20% acetone; and said second curing component comprises a solution of dimethyl-p-toluidine in cyclohexane.

14. A method for constructing orthopedic structures comprising applying to an injured body member a bandage preimpregnated with a monomer or prepolymer or mixtures thereof which is characterized by having active sites capable of further reaction, the monomer or prepolymer or mixtures being curable with a dual component curing system comprising a peroxide and a polymerization promoter and curing the bandage in situ by applying said peroxide and polymerization promoter to the bandage simultaneously.

15. The method of claim 14 wherein the simultaneous curing is effected using a co-dispensing aerosol system having a single spray orifice.

16. The method of claim 14 wherein the curing is effected using two containers in which the two curing components are separately packaged and to which is attached a single spray head which merges the two components and emits a single combined stream.

* * * * *

UNITED STATES PATENT AND TRADEMARK OFFICE
CERTIFICATE OF CORRECTION

PATENT NO. : 3,908,644
DATED : September 30, 1975
INVENTOR(S) : L.F. Nienart, R.C. Linares, P. Jeges, and Z. Blank It is certified that error appears in the above—identified patent and that said Letters Patent are hereby corrected as shown below:

Cover Page, line 2, change "Neinart et al" to
-- Nienart et al -- .

Cover Page, line 5, change "Louis F. Neinart" to
-- Louis F. Nienart -- .

Signed and Sealed this thirtieth Day of December 1975

[SEAL]

Attest:

RUTH C. MASON
*Attesting Officer*

C. MARSHALL DANN
*Commissioner of Patents and Trademarks*